(12) United States Patent
Ookubo et al.

(10) Patent No.: US 8,409,319 B2
(45) Date of Patent: Apr. 2, 2013

(54) SILICON PURIFICATION METHOD

(75) Inventors: Yasuo Ookubo, Tsukuba (JP); Youichi Hirose, Tsukuba (JP); Hiroshi Nagata, Tsukuba (JP)

(73) Assignee: Ulvac, Inc., Chigasaki-Shi (JP)

( * ) Notice: Subject to any disclaimer, the term of this patent is extended or adjusted under 35 U.S.C. 154(b) by 137 days.

(21) Appl. No.: 13/058,471

(22) PCT Filed: Aug. 11, 2009

(86) PCT No.: PCT/JP2009/064198
§ 371 (c)(1),
(2), (4) Date: Feb. 10, 2011

(87) PCT Pub. No.: WO2010/018831
PCT Pub. Date: Feb. 18, 2010

(65) Prior Publication Data
US 2011/0132142 A1    Jun. 9, 2011

(30) Foreign Application Priority Data
Aug. 12, 2008  (JP) .................................. P2008-207797

(51) Int. Cl.
C01B 33/037 (2006.01)
C22B 9/22 (2006.01)
(52) U.S. Cl. .......................................... 75/10.13; 75/401
(58) Field of Classification Search ................. 75/10.13, 75/401; 423/348
See application file for complete search history.

(56) References Cited

U.S. PATENT DOCUMENTS 5,454,424 A    10/1995  Mori et al.
6,231,826 B1    5/2001  Hanazawa et al.
6,533,838 B1    3/2003  Yamamura et al.
7,687,019 B2 *  3/2010  Yamauchi et al. ............ 266/184
7,704,478 B2    4/2010  Yamauchi et al.
2005/0074388 A1  4/2005  Baluais et al.

FOREIGN PATENT DOCUMENTS

| CN | 1167728 | 12/1997 |
| DE | 696 21 348 | 9/2002 |
| DE | 10 2006 038 044 | 3/2007 |
| EP | 0 796 820 | 3/1997 |

(Continued)

OTHER PUBLICATIONS

Machine translation of JP 07-309614 A, published Nov. 28, 1995.*

(Continued)

Primary Examiner — George Wyszomierski
Assistant Examiner — Tima M McGuthry Banks
(74) Attorney, Agent, or Firm — Grossman, Tucker, Perreault & Pfleger, PLLC

(57) ABSTRACT

A silicon purification method includes a solidification purification step comprising: preparing the base material to be purified, loading the base material into a crucible, irradiating part of the base material, and fully melting the base material; gradually solidifying the base material by gradually weakening an electron beam so that the solidification proceeds until the solidifying portion occupies a first predetermined ratio of the base material; loading the remnant of the base material into the crucible, and fully melting the remnant of the base material by irradiating the entire area of the remnant of the base material with the electron beam; gradually solidifying the molten metal portion by gradually weakening the electron beam so that the solidification proceeds until the solidifying portion occupies a second predetermined ratio of the molten metal portion; and removing an unsolidified molten metal portion.

5 Claims, 4 Drawing Sheets

FOREIGN PATENT DOCUMENTS

| | | |
|---|---|---|
| EP | 0 869 102 | 5/2002 |
| JP | 61-232295 | 10/1986 |
| JP | 3-20422 | 1/1991 |
| JP | 5-124809 | 5/1993 |
| JP | 07309614 A * | 11/1995 |
| JP | 8-217436 | 8/1996 |
| JP | 10-251008 | 9/1998 |
| JP | 10-273313 | 10/1998 |
| JP | 11-209195 | 8/1999 |
| JP | 2000-129372 | 5/2000 |
| JP | 2001-335854 | 12/2001 |
| JP | 2006-206951 | 8/2006 |
| JP | 2006-273669 | 10/2006 |
| JP | 2007-051047 | 3/2007 |

OTHER PUBLICATIONS

N. Yuge et al., "Removal of Metal Impurities in Molten Silicon by Directional Solidification with Electron Beam Heating", Journal of the Japan Institute of Metals, vol. 67, No. 10, pp. 575-582 (Oct. 2003) including English abstract on front page.

International Search Report from corresponding PCT Application No. PCT/JP2009/064198 dated Nov. 17, 2009.

Office Action from corresponding Taiwanese Application No. 098125964 dated Jul. 23, 2012. English translation attached.

International Search Report from corresponding PCT Application No. PCT/JP2009/003629 dated Sep. 15, 2009.

Notice of Allowance from corresponding U.S. Appl. No. 13/056,496 dated Sep. 7, 2012.

Office Action from corresponding Chinese Application No. 2009801305131 dated Aug. 2, 2012. Partial English translation attached.

Office Action from corresponding German Application No. 11 2009 001 864.5 dated Mar. 30, 2012. English translation attached.

Office Action from corresponding German Application No. 11 2009 001 953.6 dated Aug. 1, 2012. English translation attached.

Office Action from corresponding Taiwanese Application No. 098127160 dated Jul. 26, 2012. English translation attached.

* cited by examiner

SILICON PURIFICATION METHOD

CROSS-REFERENCE TO RELATED APPLICATIONS

This is the U.S. National Phase Application under 35 U.S.C. §371 of International Patent Application No. PCT/JP2009/064198 filed Aug. 11, 2009, which designated the United States and was published in a language other than English, which claims the benefit of Japanese Patent Application No. 2008-207797 filed on Aug. 12, 2008, both of them are incorporated by reference herein. The International Application was published in Japanese on Feb. 18, 2010 as WO2010/018831 A1 under PCT Article 21(2).

BACKGROUND OF THE INVENTION

1. Field of the Invention

The present invention relates to a silicon manufacturing method that purifies a metallic silicon material by irradiating an electron beam, and particularly to a silicon purification method where it is possible to purify high-purity silicon with a low content of phosphorous (P), iron (Fe), aluminum (Al), or calcium (Ca), which is suitable for a solar cell material.

2. Background Art

As a conventional silicon purification method, a method is disclosed that continuously purifies impurities, such as phosphorous, above a water-cooled copper hearth by vaporization, drops into a copper-made water-cooled mold, and then solidifies unidirectionally from the bottom by irradiating an electron beam to the molten surface (P. 575 to 582, No. 10, Vol. 67, Journal of the Japan Institute of Metals (October 2003)).

However, this method requires both a purification mechanism for dephosphorization and a solidification purification mechanism, which leads to a complex apparatus.

In addition, when conducting solidification purification, new silicon which has never been subjected to solidification purification is continuously fed into a molten pool and mixed at all times. As a result, the purification effect is inferior to a case where a metal to be solidification-purified is fully melted and then solidified unidirectionally.

Furthermore, in the method of P. 575 to 582, No. 10, Vol. 67, Journal of the Japan Institute of Metals (October 2003), as the height of a solidified layer increases, the temperature gradient in a liquid phase decreases in a direction perpendicular to the solidification interface in the vicinity of the interface (solidification interface) between the liquid phase and a solid phase. Therefore, a constitutional supercooling (described below) is likely to occur.

In practice, according to an analysis of the impurity concentration distribution in an ingot in an industrial sized testing apparatus, a purification effect is lowered remarkably at a position which exceeds 50% or 60% height in the depth direction.

Moreover, in order to solve the above problems, a solidification purification method has been suggested including a mechanism that rotates a water-cooled copper mold (P. 575 to 582, No. 10, Vol. 67, Journal of the Japan Institute of Metals (October 2003) and Japanese Unexamined Patent Application, First Publication No. H10-251008).

However, this method requires the addition of a mechanism that rotates the mold and reverses the rotation direction at appropriate time intervals, which leads to a problem in that the equipment becomes more complicated.

In addition, in order to actually increase purification efficiency, rotation of the mold at a high speed is required, which leads to a problem in that the molten metal scatters away due to the centrifugal force.

Furthermore, in a case where the mold is not rotated, silicon forms a shallow solidified layer, that is, scull on the wall surface of the water-cooled copper mold, but if the mold is rotated at a high speed, scull is not formed, and thus molten silicon metal and the copper mold are brought into direct contact, which necessitates that consideration be given to contamination by copper constituting the mold.

Incidentally, it is known that, particularly in the case of silicon, the equilibrium distribution coefficient (the ratio of the impurity concentration in a liquid phase to the impurity concentration in a solid phase in a case where impurities are fully homogenized in a liquid phase via convection or diffusion) of the impurity elements, such as Fe and Al, which are impurities other than B and P, is extremely small, and these impurities can be efficiently removed by solidification purification.

However, in reality, in the case of solidifying at a limited solidification speed in consideration of productivity, impurities discharged into the liquid phase from the solidification interface are distributed along the solidification interface in a higher concentration without being transported or homogenized via diffusion or convection.

The distribution coefficient of impurities in consideration of such a phenomenon, that is, the effective distribution coefficient is closer to 1 than the equilibrium distribution coefficient, thereby degrading purification efficiency.

Furthermore, in actual solidification, impurities extruded and concentrated along the solidification interface lower the melting point of the liquid phase, and, from the relative relationship between the melting point corresponding to the concentration distribution and the actual temperature distribution, unsolidified portions occur even above the melting point in the vicinity of the solidification interface.

Such a phenomenon is called constitutional supercooling, and, due to this phenomenon, the solidification interface becomes unstable and loses flatness, thereby increasing unevenness (cell growth), and, in an extreme case, the solidification interface grows in a dendrite shape (branch shape).

That is, silicon crystal grows into the liquid phase in a protrusion shape, and impurities are pushed away to both sides.

Therefore, impurity elements are segregated at a micro level, but barely segregated at a macro level, therefore a solidification purification effect is significantly lost.

In particular, such a constitutional supercooling is known to easily occur in the case of (1) a slow temperature gradient in a liquid phase in the vicinity of the solidification interface, (2) a high impurity concentration, and (3) a high solidification speed.

Among smelting methods using an electron beam heating and melting method, which have been conventionally suggested, there are problems in a method that removes impurities with a high vapor pressure, such as phosphorous, and further combines solidification purification therewith in that the equipment used is complicated and the equipment cost becomes high.

In order to solve the above problems, the object has been to develop a method in which it is possible to realize both purifications of solidification purification and dephosphorization by a simple apparatus with a low equipment cost.

As methods to solve the above problems, for example, a method has been considered that fully melts silicon using an electron beam melting method using a water-cooled copper hearth, gradually weakens the output, solidifies the melted silicon unidirectionally from the molten metal bottom toward the molten metal surface side which is irradiated by the electron beam, extrudes a liquid phase in which impurities are concentrated, and thereafter conducts dephosphorization purification.

Alternatively, a method has been considered that conducts dephosphorization purification first, and then conducts solidification unidirectionally.

However, such methods have a problem of low production efficiency since only limited metallic silicon materials can be melted at one time.

The reason is that, if a large amount of metallic silicon material is loaded into a water-cooled copper hearth in an electron beam melting furnace at one time, the metallic silicon material is not melted in the bottom, and thus scull occurs.

SUMMARY OF THE INVENTION

The present invention has been made to solve the above conventional problems and has an object to provide a silicon purification method where it is possible to achieve an increase in the purification efficiency of metallic silicon material and an improvement in productivity.

A silicon purification method of the present invention includes: a solidification purification step in which metal impurities are removed by irradiating a base material made of metallic silicon with an electron beam. The solidification purification step sequentially includes: a step (A) of preparing the base material to be purified at one time, loading a part of the base material into a water-cooled crucible, irradiating, with the electron beam, the entire area of the part of the loaded base material that is disposed under a high vacuum atmosphere, and thereby fully melting the part of the base material; a step (B) of gradually solidifying the molten part of the base material from a molten metal bottom thereof toward a molten metal surface thereof by gradually weakening an output of the electron beam so that the solidification proceeds until the solidifying portion occupies a first predetermined ratio of the total of the base material; a step (C) of further loading the remnant of the base material into the water-cooled crucible, and fully melting the remnant of the base material by irradiating the entire area of the remnant of the base material with the electron beam; a step (D) of gradually solidifying the molten metal portion from a bottom thereof toward a molten metal surface thereof by gradually weakening an output of the electron beam so that the solidification proceeds until the solidifying portion occupies a second predetermined ratio of the total of the molten metal portion; and a step (E) of removing an unsolidified molten metal portion.

In the silicon purification method of the present invention, it is preferable that, metallic silicon which be before dephosphorization purification is used as the base material, and the silicon purification method further includes a dephosphorization purification step, and the dephosphorization purification step includes: after the solidification purification step, continuously irradiating, with the electron beam, the entire area of the base material which is in the water-cooled crucible and from which metal impurities were removed; and continuously irradiating a molten metal portion of the molten base material from which the metal impurities was removed, with the electron beam for a predetermined time, and thereby volatilizing and removing phosphorus by use of a vacuum refining method.

In the silicon purification method of the present invention, it is preferable that, when the part of the base material is fully melted by irradiation of the electron beam (step (A)), an amount of the part of silicon to be molten be set so that the depth thereof is in a range of 10 to 30 mm in a state of being loaded into a water-cooled copper hearth, and a total amount of the base material to be purified at one time be set so that the depth thereof is in a range of 40 to 70 mm in a state of being loaded into a water-cooled copper hearth.

In the silicon purification method of the present invention, it is preferable that, in the water-cooled copper hearth, the shorter of the width and the length be four times or more the depth thereof.

In the silicon purification method of the present invention, it is preferable that, when the part of the base material is fully melted by irradiation of the electron beam (step (A)) and when the remnant of the base material is fully melted by irradiation of the electron beam (step (C)), a maximum level of irradiation density of the electron beam be in a range of 1500 kW/m² to 3000 kW/m².

ADVANTAGEOUS EFFECTS OF INVENTION

According to the present invention, after a part of metallic silicon base material to be purified at one time is melted and solidification-purified, and after the remainder of the silicon base material is additionally melted and solidification-purified, due to solidification purification, it is possible to increase the amount of silicon to be solidification-purified at one time (one batch) with an electron beam irradiation, whereby there is an effect of achieving an improvement in productivity.

In addition, according to the present invention, since dephosphorization purification is conducted by irradiating an electron beam after decreasing the absolute amount of a liquid phase by conducting solidification purification with an electron beam irradiation and removing the impurity-concentrated liquid phase, there is an effect that can further increase purification efficiency.

DESCRIPTION OF THE PREFERRED EMBODIMENTS

Hereinafter, the present invention will be described in detail with reference to the accompanying drawings.

The scope of the present invention is not limited to the below-described embodiments, and a variety of modification can be added within a scope that does not depart from the gist of the present invention.

FIGS. 1A to 1D and FIGS. 2A to 2D are cross-sectional views schematically illustrating the silicon purification order of the present invention.

In FIGS. 1A to 1D and FIGS. 2A to 2D, a water-cooled crucible 10 is a shallow crucible, and, here, a shallow water-cooled copper hearth is used.

Figure 1A:
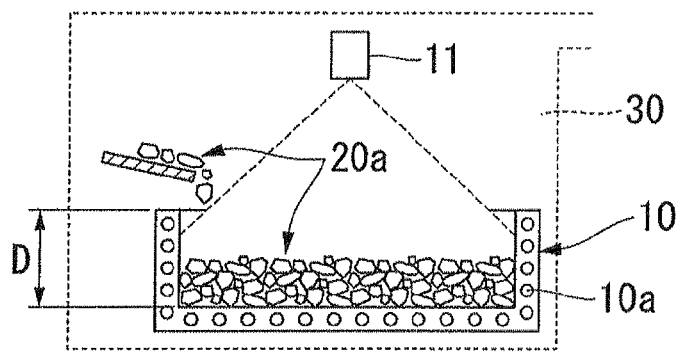
FIG. 1A is a cross-sectional view schematically illustrating the silicon purification order of the present invention.
Figure 1B:
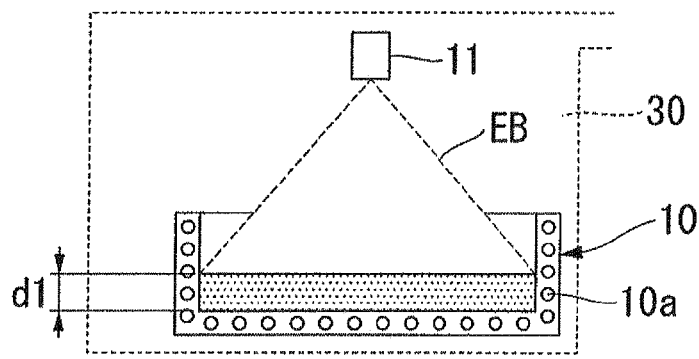
FIG. 1B is a cross-sectional view schematically illustrating the silicon purification order of the present invention.
Figure 1C:
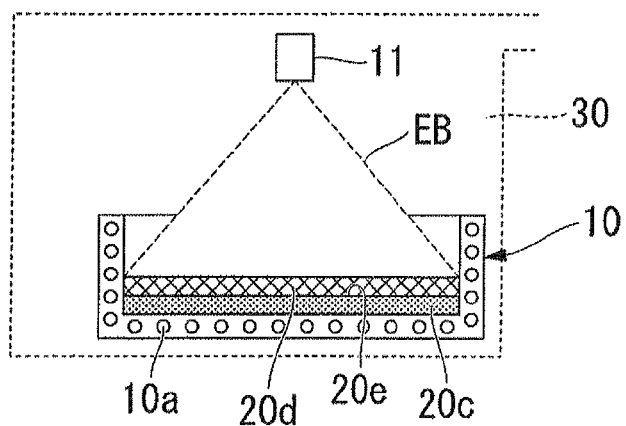
FIG. 1C is a cross-sectional view schematically illustrating the silicon purification order of the present invention.
Figure 1D:
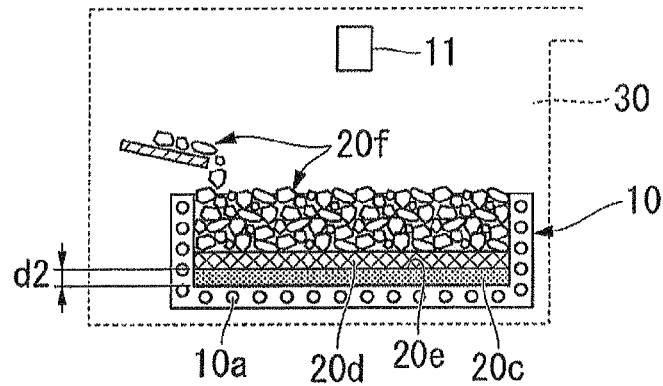
FIG. 1D is a cross-sectional view schematically illustrating the silicon purification order of the present invention.
Figure 2A:
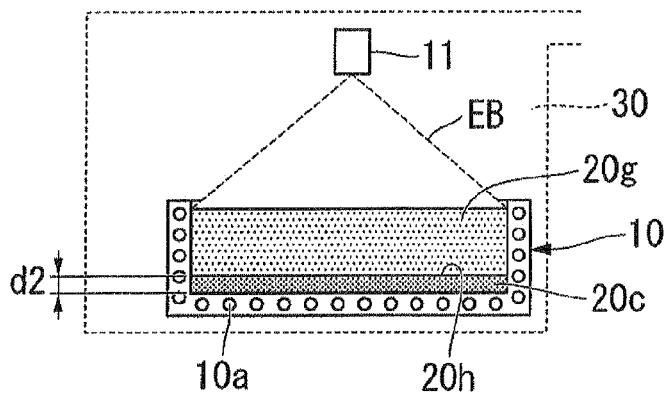
FIG. 2A is a cross-sectional view schematically illustrating the silicon purification order of the present invention.
Figure 2B:
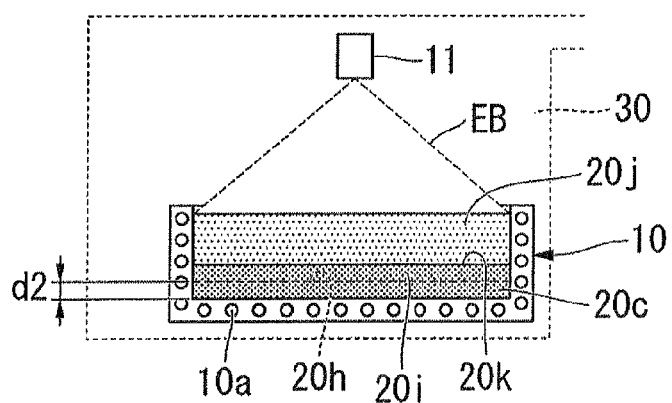
FIG. 2B is a cross-sectional view schematically illustrating the silicon purification order of the present invention.
Figure 2C:
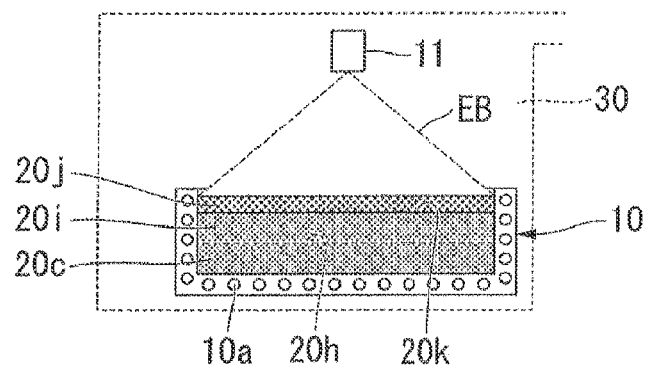
FIG. 2C is a cross-sectional view schematically illustrating the silicon purification order of the present invention.
Figure 2D:
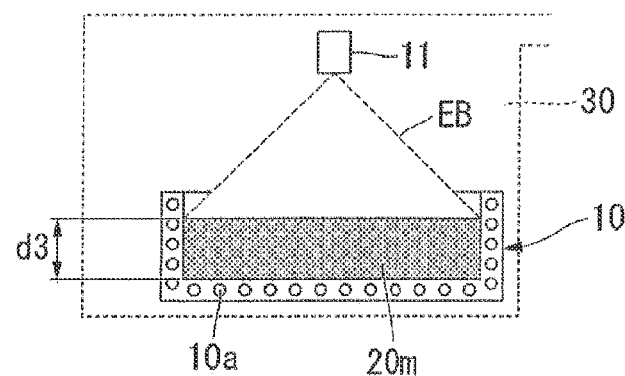
FIG. 2D is a cross-sectional view schematically illustrating the silicon purification order of the present invention.

Meanwhile, FIGS. 1A to 1D and FIGS. 2A to 2C are views illustrating the solidification purification of the present invention, and FIG. 2D is a view illustrating the dephosphorization purification of the present invention.

Water passages 10a are formed in the bottom portion and four side portions of the water-cooled crucible (water-cooled copper hearth) 10.

The water passages 10a constitute a water-cooling mechanism provided in the water-cooled copper hearth 10.

In addition, an electron beam irradiation device 11 is disposed opposite to the opening portion of the water-cooled copper hearth 10.

The electron beam irradiation device 11 includes, for example, an electron gun and a deflecting coil, and irradiates, with an electron beam EB outputted from the electron gun, the metal material loaded into the water-cooled copper hearth 10, thereby melting the metal material.

The water-cooling mechanism cools and solidifies the melted metal.

These water-cooled copper hearth 10 and electron beam irradiation device 11 are disposed under a high vacuum atmosphere 30 in an electron beam melting furnace.

Here, the high vacuum atmosphere 30 is preferably $10^{-2}$ Pa or less.

First of all, as shown in FIG. 1A, a metallic silicon material (a base material made of metallic silicon) 20a is loaded into the shallow water-cooled copper hearth 10.

This metallic silicon material 20a is part of a metallic silicon material to be purified at one time in the water-cooled copper hearth 10.

The amount of the metallic silicon material 20a to be loaded at the start is set to make a thickness of the metallic silicon material 20a loaded in the water-cooled copper hearth in a range of 10 mm to 30 mm.

If the thickness of the metallic silicon material 20a is less than 10 mm, it is not possible to increase the overall melting amount, and thus productivity deteriorates.

On the other hand, if the thickness of the metallic silicon material 20a is more than 30 mm, the amount of scull occurring increases, and thus purification efficiency lowers.

More desirably, the amount of the metallic silicon material 20a to be loaded at the start makes a thickness of the metallic silicon material 20a loaded in the water-cooled copper hearth in a range of 15 mm to 25 mm.

Meanwhile, in the water-cooled copper hearth 10, the shorter of the width and the length is desirably four times or more the depth D thereof.

When the shorter of the width and the length of the water-cooled hearth is smaller than four times the depth D, the area of the water-cooled hearth is small with respect to the depth, and the melting amount is small, whereby productivity does not improve.

Next, as shown in FIG. 1B, an electron beam EB is irradiated from the electron beam irradiation device 11 over the entire surface of the water-cooled copper hearth 10 into which the metallic silicon material 20a has been loaded, thereby fully melting the metallic silicon material 20a.

Thereby, the metallic silicon material 20a loaded in the water-cooled copper hearth 10 becomes fully molten metallic silicon 20b.

Meanwhile, in FIG. 1B, it is desirable, for example, to irradiate the electron beam over the entire surface with the irradiation density being 1500 kW/m$^2$ to 3000 kW/m$^2$, thereby melting the metallic silicon material.

If the irradiation density of the electron beam is less than 1500 kW/m$^2$, it is not possible to sufficiently melt the silicon material.

Conversely, if the irradiation density of the electron beam is 3000 kW/m$^2$ or more, a disadvantage of exceeding the water-cooling capacity of the water passages 10a occurs.

Next, as shown in FIG. 1C, the molten metallic silicon 20b is gradually solidified from the bottom of the water-cooled copper hearth 10 by gradually weakening the irradiation output (irradiation density) of the electron beam EB without varying the irradiation width of the electron beam EB (the electron beam EB is still irradiated over the entire surface), whereby a solidified portion 20c becomes formed.

At this time, impurities, such as Fe, Al, Ca, and the like, are condensed mainly in a molten metal portion 20d which is not yet solidified.

With the interface 20e between the solidified portion 20c and the molten metal portion 20d as a boundary, the impurity concentration of the solidified portion (impurity-purified portion) 20c is much lower than the impurity concentration of the molten metal portion (impurity-condensed portion) 20d.

Meanwhile, in FIG. 1C, the impurities, such as Fe, Al, Ca, and the like, are present mainly in the molten metal portion 20d, but if the solidification speed is too fast, the purification efficiency is lowered.

Therefore, the impurities remain even in the solidified portion 20c, therefore, it is not possible to purify high-purity silicon.

Therefore, the irradiation output of the electron beam EB is controlled so that, for example, the solidification speed becomes 2 mm/min or less, that is, the irradiation output is gradually weakened.

In the present invention, as shown in FIG. 1A, all of the metallic silicon material to be purified at one time is not loaded, but part of thereof is loaded into the water-cooled copper hearth 10, and the thickness d of the molten metal is maintained at a maximum of 30 mm, and therefore scull scarcely occurs.

In addition, it is possible to increase the temperature gradient of a liquid phase in a direction perpendicular to the solidification interface in the vicinity of the interface (solidification interface) between the liquid phase and a solid phase by gradually weakening the irradiation output (irradiation density) of the electron beam EB while irradiating the electron beam EB over the entire surface of the molten metallic silicon 20b.

By controlling the solidification speed at 2 mm/min or less while obtaining the above effect, it is possible to suppress constitutional supercooling and to increase the purification effect.

Next, as shown in FIGS. 1C and 1D, while the output of the electron beam irradiated over the entire surface is gradually weakened, solidification proceeds and the interface 20e between the impurity-purified portion (solidified portion) 20c and the impurity-condensed portion (molten metal portion) 20d moves up, therefore, the ratio of the impurity-purified portion (solidified portion) 20c becomes greater than the ratio of the impurity-condensed portion (molten metal portion) 20d in the total amount of the silicon material.

In such a solidification process, once the ratio of the impurity-condensed portion (molten metal portion) 20d becomes at least smaller than that of the impurity-purified portion (solidified portion) 20c, the irradiation of the electron beam is stopped once, and, from the metallic silicon material that is purified at one time in the water-cooled copper hearth 10, the remaining metallic silicon material 20f, which has not been loaded at the start, is loaded into the water-cooled copper hearth 10.

Desirably, the remaining metallic silicon material 20f is loaded once the ratio of the impurity-condensed portion (molten metal portion) 20d becomes 40% or less of the entire body (solidified portion 20c and molten metal portion 20d).

More desirably, once the ratio of the impurity-condensed portion (molten metal portion) 20d becomes 30% or less of the entire body, the remaining metallic silicon material 20f is loaded.

When loading the remaining metallic silicon material 20f, the thickness dimension of the impurity-purified portion 20c is d1.

Next, as shown in FIG. 2A, the entire surface of the loaded metallic silicon material 20f is irradiated again with an electron beam EB so as to fully melt the metallic silicon material 20f and the impurity-condensed portion 20d of the metallic silicon material that was loaded at the start, thereby obtaining the molten metal portion 20g.

Meanwhile, at this time, the maximum irradiation density of the electron beam is also desirably 1500 kW/m$^2$ to 3000 kW/m$^2$.

The reason is that, if the irradiation density of the electron beam is less than 1500 kW/m$^2$, it is not possible to sufficiently melt the silicon material.

The irradiation density of the electron beam is more desirably 1800 kW/m$^2$ or more to fully melt the top portion of the prior purified portion 20c, silicon in the unpurified portion, and silicon which has been additionally loaded.

On the other hand, if the irradiation density of the electron beam exceeds 3000 kW/m$^2$, a disadvantage of exceeding the water-cooling capacity of the water passages 10a occurs, therefore the irradiation density of the electron beam is desirably 3000 kW/m$^2$ or less.

Next, as shown in FIG. 2B, the molten metallic portion 20g is gradually solidified from the interface 20h with the solidified portion (impurity-purified portion) 20c by gradually weakening the irradiation output (irradiation density) of the electron beam EB without varying the irradiation width of the electron beam EB (the electron beam EB is still irradiated over the entire surface), whereby a solidified portion 20i becomes formed.

At this time, impurities, such as Fe, Al, Ca, and the like, are condensed mainly in a molten metal portion 20j which is not yet solidified.

With the interface 20k between the solidified portion 20i and the molten metal portion 20j as a boundary, the impurity concentration of the solidified portion (impurity-purified portion) 20i is much lower than the impurity concentration of the molten metal portion (impurity-condensed portion) 20j.

Meanwhile, in FIG. 2B, the impurities, such as Fe, Al, Ca, and the like, are present mainly in the molten metal portion 20j, but if the solidification speed is too fast, purification efficiency is lowered.

Accordingly, the impurities are likely to remain even in the solidified portion 20i, therefore, it is not possible to purify high-purity silicon.

As a result, the irradiation output of the electron beam EB is controlled so that, for example, the solidification speed becomes 2 mm/min or less, that is, the irradiation output is gradually weakened.

Next, as shown in FIGS. 2C and 2D, the interface 20k between the impurity-purified portion (solidified portion) 20i and the impurity-condensed portion (molten metal portion) 20j moves up, before long, the ratio of the impurity-purified portions (solidified portions) 20c and 20i becomes greater than the ratio of the impurity-condensed portion (molten metal portion) 20j in the total amount of the silicon material.

In such a solidification process, once the ratio of the impurity-condensed portion (molten metal portion) 20i becomes smaller than the ratio of the impurity-purified portions (solidified portions) 20c and 20i, the water-cooled copper hearth 10 is tilted so as to cast (remove) the impurity-condensed portion (molten metal portion) 20j.

Desirably, when the ratio of the impurity-condensed portion (molten metal portion) 20j becomes 20% to 40% of the entire body (the solidified portions 20c and 20i, and the molten metal portion 20j), the water-cooled copper hearth 10 is tilted so as to cast (remove) the impurity-condensed portion (molten metal portion).

More desirably, when the ratio of the impurity-condensed portion (molten metal portion) 20i becomes 20% to 30% of the entire body (the solidified portions 20c and 20i, and the molten metal portion 20j), the water-cooled copper hearth 10 is tilted so as to cast (remove) the impurity-condensed portion (molten metal portion).

Meanwhile, at this time, it is also possible to solidify the entire body, re-melt a portion in which impurities for removal are condensed, and then cast and remove the impurity-condensed portion.

In addition, at this time, the thickness of the impurity-purified portion (solidified portion) is, for example, 60 mm or less after removing the impurity-condensed portion (molten metal portion).

Next, as shown in FIG. 2D, the entire surface of the remaining impurity-purified portions (solidified portions) 20c and 20j from which the impurity-condensed portion 20j has been removed is further irradiated with an electron beam EB, and the impurity-purified portions 20c and 20i are again fully melted so as to obtain a molten silicon metal portion 20m, and, even after the impurity-purified portions 20c and 20i have been fully melted, irradiation of the electron beam continues for a predetermined period of time.

After that, irradiation of the electron beam is stopped, and the molten silicon metal portion 20m is fully solidified. Therefore, high-purity silicon with a low concentration of impurities, such as Fe, Al, Ca, P, and the like can be obtained.

Impurities, such as Fe, Al, Ca, and the like are present mainly in the impurity-condensed portion (molten metal portion) 20j and removed by the above-described casting.

However, in the remaining impurity-purified portions (solidified portions) 20c and 20i, from which the impurity-condensed portion 20j has been removed, P, which is an impurity, still remains.

By fully melting the impurity-purified portions (solidified portions) 20c and 20i by the irradiation of an electron beam so as to obtain the molten silicon metal portion 20m, and further irradiating an electron beam to the molten silicon metal portion 20m, the above impurity P can be removed by volatilization by vacuum refining.

Meanwhile, in FIG. 2D, for example, in a pool with a molten metal thickness d3 of 60 mm or less, it is desirable to irradiate an electron beam over the entire surface with the irradiation density of the electron beam being 1500 kW/m² to 3000 kW/m² and melt the metallic silicon material.

The irradiation density of the electron beam is more desirably 2000 kW/m² to 2500 kW/m².

As described above, according to the present invention, it is possible to increase the amount of one batch of solidification purification by dividing the metallic silicon material to be purified at one time into two groups, and then melting them respectively.

Furthermore, according to the present invention, by conducting solidification purification and dephosphorization purification at the water-cooled copper hearth in the same electron beam melting furnace, it is possible to purify high-purity silicon within a short time and at a low cost without consumables.

In addition, compared with a case where dephosphorization purification and solidification purification are conducted separately, it is possible to omit the processes of specimen taking, crushing, and melting, whereby an increase in production can be achieved as a result of the shortened time.

In addition, by adjusting the amount of solidification-purified silicon to have the maximum molten metal thickness that can be dephosphorized, dephosphorization purification can be conducted with no waste.

Furthermore, since dephosphorization has a larger power consumption than solidification purification, and dephosphorization is conducted after solidification purification, which consequently reduces the amount of silicon, cheap production can be achieved.

EXAMPLES

Next, the present invention will be described in detail by comparing Example and Comparative Example.

Example 1

Firstly, 12.5 kg of a metallic silicon material, which is part of 35 kg of the metallic silicon material, was loaded into a water-cooled copper hearth 10 with a depth D of 10 mm, a width of 400 mm, and a length of 500 mm, using an electron beam melting furnace including two 300 kW electron guns (refer to FIG. 1A).

At this time, the metallic silicon material contained 25 ppm phosphorous (P), 350 ppm iron (Fe), 260 ppm aluminum (Al), and 7 ppm calcium (Ca).

At this time, the molten metal thicknesses converted from the weights of silicon of 12.5 kg and 35 kg were approximately 25 mm and 70 mm, respectively.

Next, the entire surface of 12.5 kg of the above loaded metallic silicon material (with an irradiation density of 2000 kW/m²) was irradiated with a 400 kW electron beam so as to fully melt 12.5 kg of the metallic silicon material (refer to FIG. 1B).

Subsequently, the molten metallic silicon was gradually solidified unidirectionally from the bottom of the hearth toward the molten metal surface by gradually weakening the output of the electron beam so as to make the solidification speed of the molten metallic silicon in the depth direction of the water-cooled copper hearth 2 mm/min without varying the irradiation width of the electron beam (the electron beam was still irradiated over the entire surface) (refer to FIG. 1C).

Moreover, when the solidification interface moved up and the molten metal portion, that is, the impurity-condensed portion made up 30% of the entire body (the molten metal portion when 12.5 kg of the metallic silicon material at the start was fully melted), the irradiation of the electron beam was stopped, and 22.5 kg of the remaining metallic silicon material from 35 kg of the above metallic silicon material was loaded into the water-cooled copper hearth (refer to FIG. 1D).

Next, an electron beam was again irradiated over the entire surface of the metallic silicon material so as to melt the silicon (refer to FIG. 2A).

At this time, the output of the electron beam was 500 kW (irradiation density of 2500 kW/m²).

Subsequently, the molten metallic silicon was gradually solidified unidirectionally by gradually weakening the output of the electron beam so as to make the solidification speed of the molten metallic silicon in the depth direction of the water-cooled copper hearth 2 mm/min without varying the irradiation width of the electron beam (the electron beam is still irradiated over the entire surface) (refer to FIG. 2B).

Moreover, when the solidification interface moved up and the molten metal portion, that is, the impurity-condensed portion made up 30% of the entire body (the solidified portion and molten metal portion of 35 kg of the metallic silicon material), the water-cooled copper hearth was tilted so as to cast (remove) the molten metal portion (refer to FIGS. 2C and 2D).

Meanwhile, at this time, it was also possible to, firstly, solidify the entire body, and re-melt the 30% portion, then cast and remove the 30% portion.

In addition, at this time, the converted thickness of the molten metallic silicon after removing the 30% molten metal was approximately 50 mm.

Next, the silicon, from which the molten metal was removed, was further irradiated over the entire surface with an electron beam output of 500 kW (irradiation density of 2500 kW/m²) so as to be melted, and, even after the silicon had been fully melted, the irradiation of the electron beam continued for 1 hour (refer to FIG. 2D).

Then, the irradiation of the electron beam was stopped, and, after fully solidifying the molten silicon metal portion, an analysis was conducted on the impurities in the purified silicon.

Analysis samples are taken from the center portions on the flat surface of the ingot, which are three places of the top, middle, and bottom portions in the thickness (height) direction of the ingot.

The results were shown in Table 1 below.

The units of the numeric values in the table are ppm.

TABLE 1

|  | Fe | Al | Ca | P |
| --- | --- | --- | --- | --- |
| Raw material Si | 350 | 260 | 7 | 25 |
| Top portion of the solidified Si | <0.1 | <0.1 | <0.1 | <0.1 |
| Middle portion of the solidified Si | <0.1 | <0.1 | <0.1 | <0.1 |
| Bottom portion of the solidified Si | <0.1 | <0.1 | <0.1 | <0.1 |

Comparative Example 1

FIGS. 3A to 3E are cross-sectional views schematically illustrating the silicon purification order of the comparative example 1.

Meanwhile, in FIGS. 3A to 3E, the same members have the same reference numbers as FIGS. 1A to 1D and FIGS. 2A to 2D.

Figure 3A:
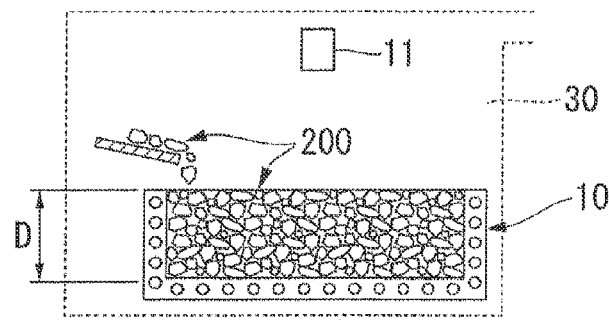
FIG. 3A is a cross-sectional view schematically illustrating the silicon purification order of a comparative example.

First of all, as shown in FIG. 3A, in the same manner as Example 1, 35 kg of a metallic silicon material 200, which belonged to the same lot as the silicon material in Example 1, was loaded into the water-cooled copper hearth 10 with a depth D of 100 mm, a width of 400 mm, and a length of 500 mm.

Figure 3B:
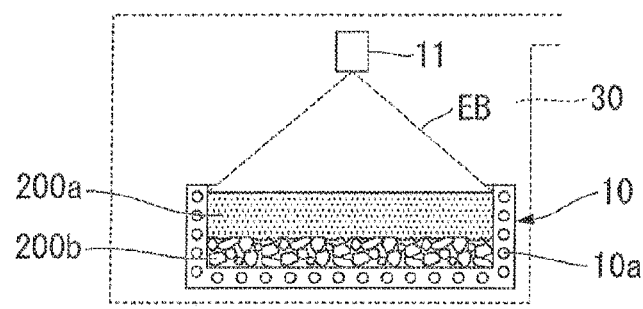
FIG. 3B is a cross-sectional view schematically illustrating the silicon purification order of a comparative example.

Next, as shown in FIG. 3B, a 500 kW electron beam EB was irradiated over the entire surface of the above loaded metallic silicon material 200 (with an irradiation density of 2500 kW/m$^2$) so as to melt the metallic silicon material 200.

At this time, due to the fact that 35 kg of the metallic silicon material 200 was loaded at one time, unmelted portions 200b remained between the bottom portion of the molten metal portion 200a and the bottom of the hearth.

Figure 3C:
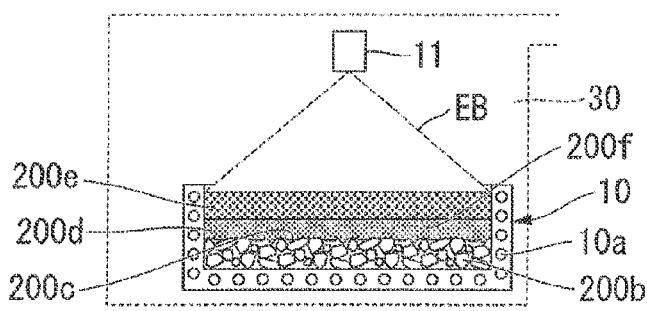
FIG. 3C is a cross-sectional view schematically illustrating the silicon purification order of a comparative example.

Subsequently, as shown in FIG. 3C, the molten metallic silicon was gradually solidified from the interface 200c with the unmelted portions 200b toward the molten metal surface by gradually weakening the output of the electron beam EB so as to make the solidification speed of the molten metallic silicon (molten metal portion 200a) in the depth direction of the water-cooled copper hearth 10 2 mm/min without varying the irradiation width of the electron beam EB (the electron beam EB was still irradiated over the entire surface).

At this time, the interface 200f between the solidified portion 200d and the molten metal portion 200e proceeded unidirectionally from the interface 200c between the unmelted portions 200b toward the molten metal surface.

Figure 3D:
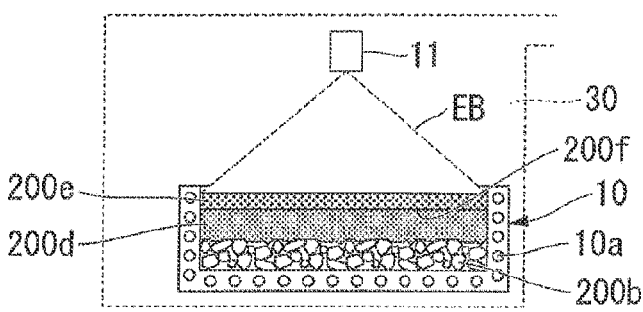
FIG. 3D is a cross-sectional view schematically illustrating the silicon purification order of a comparative example.
Figure 3E:
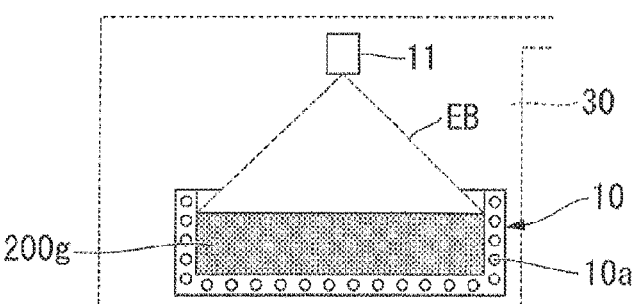
FIG. 3E is a cross-sectional view schematically illustrating the silicon purification order of a comparative example.

Moreover, as shown in FIGS. 3D and 3E, when the interface 200f between the solidified portion 200d and the molten metal portion 200e moved up and the molten metal portion 200e made up 20% of the entire body (unmelted portions 200b, solidified portion 200d, and molten metal portion 200e), the water-cooled copper hearth 10 was tilted so as to cast (remove) the molten metal portion 200e.

Meanwhile, at this time, it was also possible to, solidify the entire body, re-melt the 20% portion in which impurities for removal were condensed, and then cast and remove the 20% portion.

Next, as shown in FIG. 3E, a 500 kW electron beam EB was irradiated (with an irradiation density of 2500 kW/m$^2$) to the remaining solidified portion 200g so as to re-melt the solidified portion 200d and melt the unmelted portions 200b, and, even after being fully melted, the irradiation of the electron beam to the molten silicon metal portion 200g continued for 1 hour.

Then, the irradiation of the electron beam EB was stopped, and, after fully solidifying the molten silicon metal portion 200g, an analysis was conducted on the impurities in the purified silicon.

The results are shown in Table 2 below.

TABLE 2

|  | Fe | Al | Ca | P |
|---|---|---|---|---|
| Raw material Si | 350 | 260 | 7 | 25 |
| Top portion of the solidified Si | 52 | 15 | 0.5 | <0.1 |
| Middle portion of the solidified Si | 43 | 9 | 0.2 | <0.1 |
| Bottom portion of the solidified Si | 78 | 12 | 0.3 | <0.1 |

As evidenced by Tables 1 and 2, in the comparative example 1, since one batch of all 35 kg of the metallic silicon material was loaded at one time, the thickness of the molten metal became thick, and thick scull occurs, therefore sufficient solidification purification could not be achieved.

In contrast, in Example 1, since one batch of the metallic silicon material is loaded at two times as to be divided into two groups 12.5 kg and 22.5 kg, no scull occurs, and one batch of the metallic silicon material can be fully melted, therefore, it is possible to obtain high-purity silicon with a low content of metal impurities and phosphorous.

INDUSTRIAL APPLICABILITY

As described above, the present invention is useful for a silicon purification method in which an increase in the purification efficiency of a metallic silicon material and an improvement in productivity can be achieved.

What is claimed is:

1. A silicon purification method comprising a solidification purification step in which metal impurities are removed by irradiating a base material made of metallic silicon with an electron beam, the solidification purification step comprising:
   (A) preparing the base material to be purified at one time, loading a part of the base material into a water-cooled crucible, irradiating, with the electron beam, the entire area of a part of the loaded base material that is disposed under a high vacuum atmosphere, and thereby fully melting the part of the base material;
   (B) gradually solidifying a molten part of the base material from a molten metal bottom thereof toward a molten metal surface thereof by gradually weakening an output of the electron beam so that the solidification proceeds until the solidifying portion occupies a first predetermined ratio of the total of the base material;
   (C) further loading a remnant of the base material into the water-cooled crucible, and fully melting the remnant of the base material by irradiating the entire area of the remnant of the base material with the electron beam;
   (D) gradually solidifying a molten metal portion from a bottom thereof toward a molten metal surface thereof by gradually weakening an output of the electron beam so that the solidification proceeds until the solidifying portion occupies a second predetermined ratio of the total of the molten metal portion; and
   (E) removing an unsolidified molten metal portion, wherein the (A) to (E) is performed in this order.

2. The silicon purification method according to claim 1, wherein metallic silicon is used as the base material, and the silicon purification method further comprises a dephosphorization purification step, and wherein the dephosphorization purification step comprises:
   after the solidification purification step, continuously irradiating, with the electron beam, the entire area of the base material which is in the water-cooled crucible and from which metal impurities were removed; and
   continuously irradiating a molten metal portion of the molten base material from which the metal impurities was removed, with the electron beam for a predetermined time, and thereby volatilizing and removing phosphorus by use of a vacuum refining method.

3. The silicon purification method according to claim 1, wherein when the part of the base material is fully melted by irradiation of the electron beam, an amount of the part of silicon to be molten is set so that the depth thereof is in a range of 10 to 30 mm in a state of being loaded into the water-cooled crucible, and a total amount of the base material to be purified at one time is set so that the depth thereof is in a range of 40 to 70 mm in a state of being loaded into the water-cooled crucible.

4. The silicon purification method according to claim 1, wherein in the water-cooled crucible, the shorter of the width and the length is four times or more the depth thereof.

5. The silicon purification method according to claim 1, wherein when the part of the base material is fully melted by irradiation of the electron beam and when the remnant of the base material is fully melted by irradiation of the electron beam, a maximum level of irradiation density of the electron beam is in a range of 1500 kW/m$^2$ to 3000 kW/m$^2$.

* * * * *